(12) United States Patent
Nayler

(10) Patent No.: US 6,668,032 B1
(45) Date of Patent: Dec. 23, 2003

(54) DEVICE AND METHOD FOR SIGNAL SAMPLING AT MULTIPLE CLOCK RATES

(75) Inventor: Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/553,110

(22) Filed: Apr. 20, 2000

(51) Int. Cl.$^7$ ................................................. H04L 7/00
(52) U.S. Cl. ........................ 375/355; 375/340; 375/324; 329/304; 329/317; 329/348
(58) Field of Search ........................... 375/240.21, 321, 375/324, 340, 354–375; 329/304, 317, 348

(56) References Cited

U.S. PATENT DOCUMENTS

| | | | |
|---|---|---|---|
| 4,621,366 A | | 11/1986 | Cain et al. |
| 5,297,181 A | | 3/1994 | Barr et al. |
| 5,633,633 A | * | 5/1997 | Nakano ........................ 341/61 |
| 5,872,815 A | * | 2/1999 | Strolle et al. ................ 375/321 |
| 6,160,443 A | * | 12/2000 | Maalej et al. ................ 329/304 |
| 6,252,453 B1 | * | 6/2001 | Nayler ......................... 329/304 |
| 6,313,881 B1 | * | 11/2001 | Reinhart et al. ............. 348/572 |

* cited by examiner

*Primary Examiner*—Don N. Vo
*Assistant Examiner*—Qutub Ghulamali
(74) *Attorney, Agent, or Firm*—Renner, Otto, Boisselle & Sklar, LLP

(57) ABSTRACT

A network receiver is configured for receiving a modulated carrier signal representing a data frame from another network transceiver via a network medium, the modulated carrier signal may be either a pulse position modulated (PPM) carrier, a quadrature amplitude modulated (QAM) carrier, or a compatibility mode frame including both PPM and QAM portions. The network receiver is configured to select an A/D sampling clock frequency corresponding to the detected frame type.

7 Claims, 3 Drawing Sheets

DEVICE AND METHOD FOR SIGNAL SAMPLING AT MULTIPLE CLOCK RATES

TECHNICAL FIELD

The present invention relates generally to network interfacing, and more particularly, to a system for controlling transmission of data between network stations connected to a network medium and a device and method for setting a sampling clock rate to one of multiple clock rates based on the received signal format.

BACKGROUND OF THE INVENTION

The transmission of various types of digital data between computers continues to grow in importance. The predominant method of transmitting such digital data includes coding the digital data into a low frequency base data signal and modulating the base data signal onto a high frequency carrier signal. The high frequency carrier signal is then transmitted across a network cable medium, via RF signal, modulated illumination, or other network medium, to a remote computing station.

At the remote computing station, the high frequency carrier signal must be received and demodulated to recover the original base data signal. In the absence of any distortion of the carrier signal across the network medium, the received carrier would be identical in phase, amplitude, and frequency to the transmitted carrier and could be demodulated using known mixing techniques to recover the base data signal. The base data signal could then be recovered into digital data using known sampling algorithms.

However, the network topology tends to distort the high frequency carrier signal due to numerous branch connections and different lengths of such branches causing numerous reflections of the transmitted carrier. The high frequency carrier is further distorted by spurious noise caused by electrical devices operating in close proximity to the cable medium. Such problems are even more apparent in a network which uses home telephone wiring cables as the network cable medium because the numerous branches and connections are typically designed for transmission of plain old telephone system POTS signals in the 0.3–3.4 kilohertz frequency range and are not designed for transmission of high frequency carrier signals on the order of 7 Megahertz. Further yet, the high frequency carrier signal is further distorted by turn-on transients due to on-hook and off-hook noise pulses of the POTS utilizing the network cables.

Such distortion of frequency, amplitude, and phase of the high frequency carrier signal degrades network performance and tends to impede the design of higher data rate networks and challenges designers to continually improve modulation techniques and data recovery techniques to improve data rates. For example, under the HPNA 1.0 standard, a 1 Mbit data rate is achieved using pulse position modulation (PPM) of a carrier, while the more recent 2.0 standard achieves a 10 Mbit data rate using a complex modulation scheme utilizing a frequency diverse quadrature amplitude modulation (QAM).

A problem associated with advancing standards and increasing data rates is that, as in the HPNA example, the modulation techniques are not the same. As such, backwards compatibility is not inherent in the design of the newer systems. For example, in the HPNA system, to be backwards compatible, the newer 2.0 receiver must be able to demodulate both the PPM modulated carrier compliant with the 1.0 standard and the frequency diverse QAM modulated carrier compliant with the 2.0 standard. As such, many of the functions in the receiver must be implemented in two distinct circuits, one circuit for the PPM and one circuit for the QAM, thereby increasing the cost and complexity of the receiver.

Receivers typically include an A/D converter for sampling the modulated carrier signal and generating a series of samples occurring at a sample frequency. The series of samples are input to the remainder of the receiver circuitry that is typically implemented on a digital signal processor (DSP).

The complexity of the mathematics performed by the DSP is a function of various parameters including the sample frequency. The complexity of the mathematics also affects gate count and thus the size and cost of the DSP. As such, for a particular carrier modulation specification, the A/D sample frequency can be selected to minimize DSP gate count to reduce the DSP size and cost.

The problem exists in that the optimal sample frequency for one carrier modulation specification may not equal the optimal sample frequency for a second carrier modulation specification thereby requiring two A/D converters. Therefore, based on recognized industry goals for size and cost reductions, what is needed is a device and method for obtaining a series of samples representing a modulated carrier at two different sample frequencies but not requiring two A/D converters.

SUMMARY OF THE INVENTION

A first aspect of the present invention is to provide a network receiver configured for receiving a modulated carrier signal representing a frame of data from another network transmitter via a network medium. The network receiver comprises an analog to digital converter generating a sequence of digital samples representing the modulated carrier signal. The sequence of digital samples occur at an A/D clock frequency. A frame detection circuit sets the A/D clock frequency to a first sampling frequency when a first frame specification is detected and sets the sampling clock frequency to a second sampling frequency when a the first frame specification is not detected.

The network receiver may further include a receiver circuit recovering data from the digital samples and generating a frame type signal indicating the frame specification. The first frame specification may utilize pulse position modulation of the carrier signal. A second frame specification may utilize quadrature amplitude modulation of the carrier signal and a third frame specification utilizes a combination of pulse position modulation of the carrier signal and quadrature amplitude modulation of the carrier signal.

The frame detection circuit may include a carrier sense circuit for detecting the duration of a power pulse in an envelope signal and the envelope signal may represent the square root of the sum of the square of the I channel carrier signal and the square of the Q channel carrier signal.

The frame detection circuit may set the A/D clock frequency to the first sampling frequency when the duration of a power pulse is less than a duration on the order of a duration of a pulse position modulation power pulse and the frame type signal does not indicate the third frame type. Further, the frame detection circuit may set the A/D clock frequency to the second sampling frequency when power pulses of a duration on the order of a pulse position modulation power pulse are not detected or when the frame type signal indicates one of the second and third frame type.

A second aspect of the present invention is to provide a method of determining an A/D clock setting for sampling a modulated carrier signal representing a data frame in a receiver configured for receiving a modulated carrier signal from a network medium. The method comprises: a) detecting whether the frame corresponds to a first modulation specification; b) selecting a first A/D clock setting in response to detecting a frame corresponding to the first modulation specification; and c) selecting a second A/D clock setting in response to not detecting a frame corresponding to the first modulation specification.

The method may further include detecting whether the frame corresponds to a second modulation specification and whether the frame corresponds to a third modulation specification. The first frame specification may utilize pulse position modulation of the carrier signal. A second frame specification may utilize quadrature amplitude modulation of the carrier signal and a third frame specification utilizes a combination of pulse position modulation of the carrier signal and quadrature amplitude modulation of the carrier signal.

The method may further include detecting the duration of a power pulse in the carrier signal. A/D clock frequency may be set to the first sampling frequency when the duration of a power pulse is less than a duration on the order of a duration of a pulse position modulation power pulse and third frame type is not detected. A/D clock frequency may be set to the second sampling frequency when power pulses are of a duration on the order of a pulse position modulation power pulse and the third frame type is not detected or when one of the second frame type and the third frame type are detected.

DESCRIPTION OF THE PREFERRED EMBODIMENTS

Figure 1:
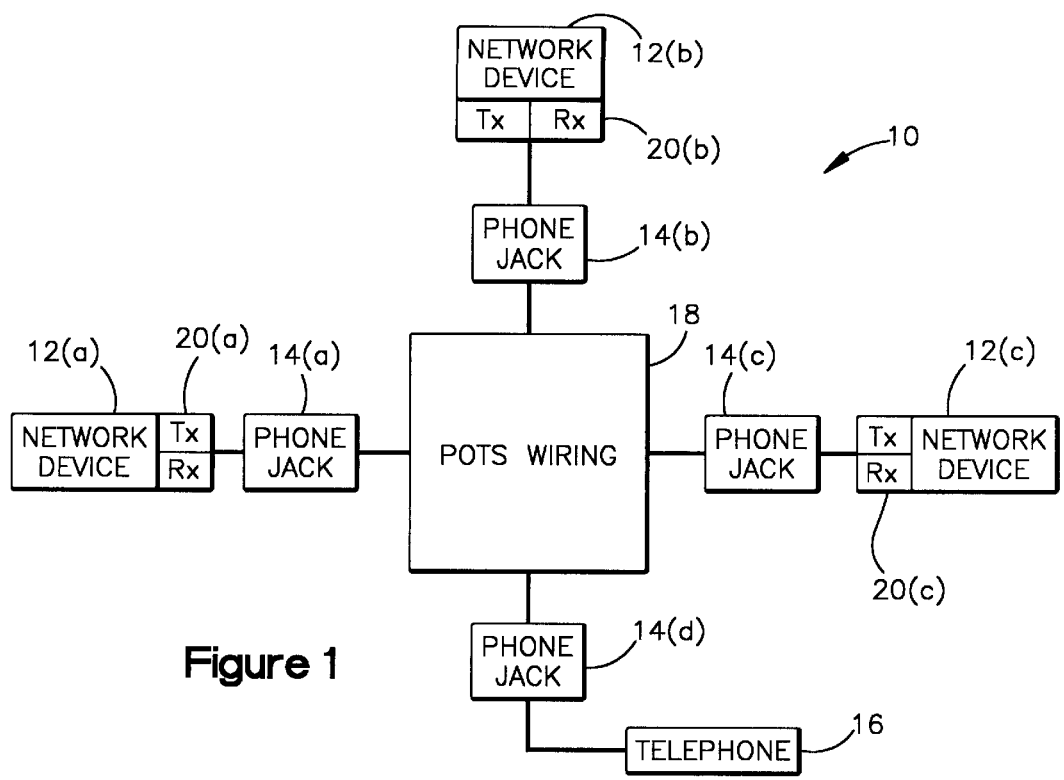
FIG. 1 is a block diagram of a local area network in accordance with one embodiment of this invention.

The present invention will now be described in detail with reference to the drawings. In the drawings, like reference numerals are used to refer to like elements throughout.

FIG. 1 is a diagram of a local area network 10 implemented in a home environment using twisted pair network media according to an embodiment of this invention. As shown in FIG. 1, the network 10 includes network stations 12(a)–12(c) that are connected to a telephone line (twisted pair) wiring 18 via RJ-11 phone jacks 14(a)–14(c) respectively. A telephone 16 is connected to an RJ-11 phone jack 14(d) and may continue to make telephone calls while network devices 12(a)–12(c) are communicating network data.

As shown in FIG. 1, each network device 12 may be a personal computer, printer, server, or other intelligent consumer device and each includes a transceiver 20(a)–20(c) respectively for communicating with other network devices 12(a)–12(c) via the network media 18.

Each of network devices 12(a)–12(c) communicates by transmitting an analog network signal comprising a carrier signal modulated with network data. A portion of network devices 12(a)–12(c) may utilize pulse position modulation (PPM) wherein network data is modulated on the carrier utilizing discrete band limited pulses. Another portion of network devices 12(a)–12(c) may selectively utilize PPM modulation or quadrature amplitude modulation (QAM) wherein network data is modulated on the carrier by varying both the amplitude and phase of the carrier in accordance with a complex encoding constellation. In the preferred embodiment, the PPM modulation adheres to the Home Phoneline Network Alliance (HPNA) 1.0 standard, as promulgated by a consortium of network equipment providers including Advance Micro Devices, Inc. of Sunnyvale, Calif., and provides for a 1 Mbit data rate, and the QAM modulation adheres to the HPNA 2.0 standard and provides for a 10 Mbit data rate. As such, it should be appreciated that data communication between a networked device 12 which is only capable of PPM modulation and any other device will utilize a PPM modulated carrier. However, data communication between two devices that are capable of both PPM and QAM modulation will utilize the faster data rate of a QAM modulated carrier. Therefore, at the receiving network device, it should be appreciated that a transceiver 13(a)–13(c) capable of both PPM and QAM must be able to receive data utilizing both a PPM and a QAM modulated carrier which includes detecting the presence of each such carrier, distinguishing between each such carrier, and receiving and demodulating each such carrier.

Further yet, to facilitate communication between devices 12(a)–12(c) in network 10 which includes both HPNA 1.0 devices and HPNA 2.0 devices, a third mode of operation called compatibility mode exists. A compatibility mode frame utilizes a PPM modulated header immediately followed by QAM modulated data. A transceiver 20(a)–20(c) must further be able to distinguish between a PPM frame and a compatibility mode frame and appropriately receive each.

Figure 2A:
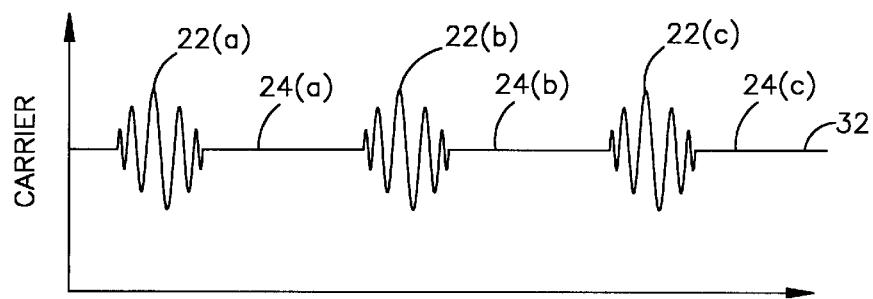
FIG. 2a is a diagram of a pulse position modulated carrier in accordance with one embodiment of this invention.
Figure 2B:
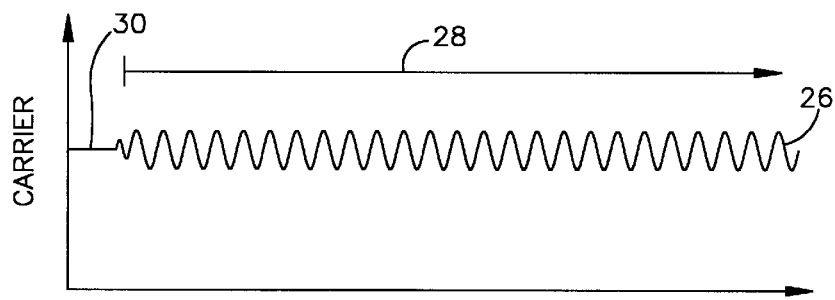
FIG. 2b is a diagram of a quadrature amplitude modulated carrier in accordance with one embodiment of this invention.

A PPM modulated carrier and a QAM modulated carrier are fundamentally different. Referring to FIG. 2a, a PPM modulated carrier 32 includes a plurality of distinct power pulses 22(a)–22(c) separated by power dwells 24(a)–24(c) within each frame. The duration of time between power pulses 22(a)–22(c) represents encoded data. Referring to FIG. 2b, a QAM modulated carrier 26 includes a continuous power carrier during the duration of a frame 28 with a power dwell 30 only occurring between frames. The time varying phase and the amplitude of carrier 26 represent encoded data.

As discussed previously, the complexity of the receiver circuitry, and more specifically the gate count, size, and cost of integrated circuits within the receiver, is a function of various parameters including the sampling frequencies and the carrier modulation specification.

Because the QAM carrier and the PPM carrier are fundamentally different, a sampling frequency selected to optimize the QAM receiver hardware will be different than the sampling frequency selected to optimize the PPM receiver hardware. More specifically, in the HPNA environment, QAM receiver circuitry can be optimized if a 32 MHz sampling frequency can be selected and PPM receiver circuitry can be optimized if a 30 Mhz sampling frequency can be selected.

Figure 3:
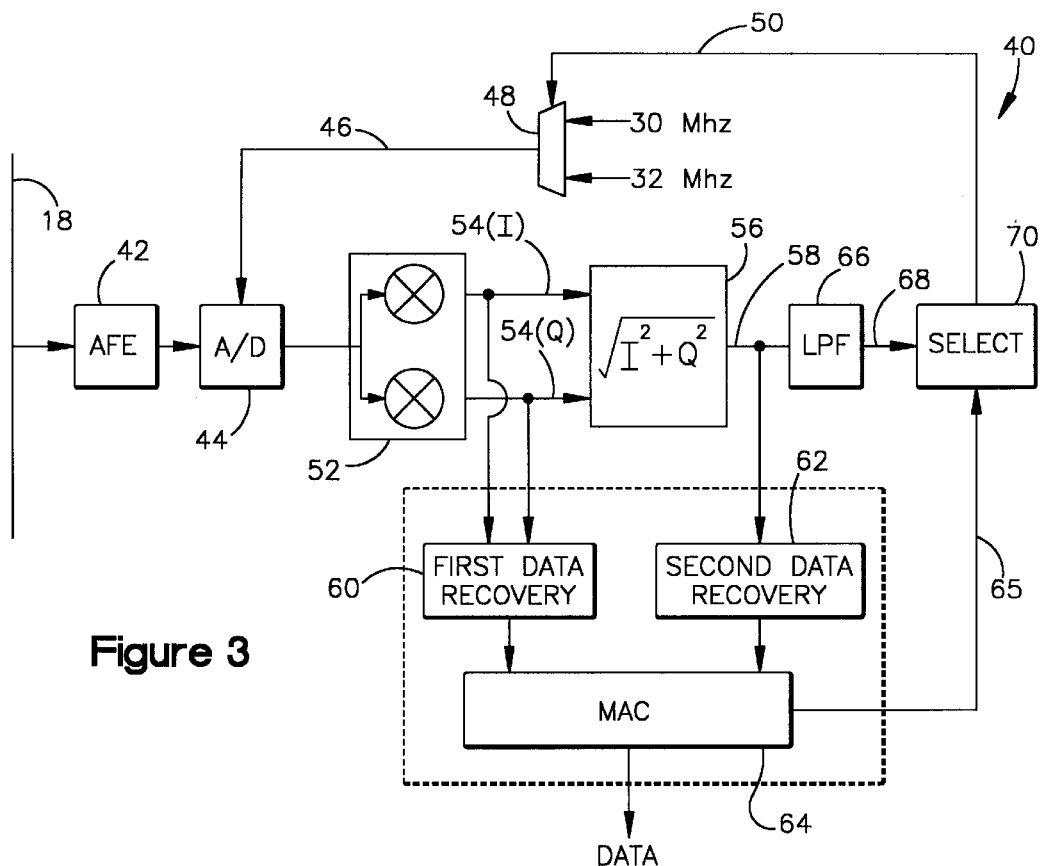
FIG. 3 is a block diagram of a receiver circuit in accordance with one embodiment of this invention.

Referring to FIG. 3, a receiver circuit 40 in accordance with one embodiment of this invention is shown. An analog front end 42 (AFE) is coupled to the POTS wiring 18 to receive a modulated carrier signal representing a frame of data from a remote transmitting device. The AFE includes an amplifier for amplifying the carrier to utilize the full dynamic range of A/D converter 44.

A/D converter 44 samples the modulated carrier and generates a series of digital sample values occurring at the A/D clock frequency as input to A/D converter 44 on clock input line 46.

A multiplexer 48 operates to couple either a 30 Mhz clock or a 32 Mhz clock to clock input line 46 in response to a clock select signal on line 50.

The digital sample values are then input to a Hilbert transformer 52 which functions using known techniques to separate an I channel signal on line 54(I) and a Q channel signal on line 54(Q) from the digital sample values. The I channel signal and the Q channel signal are input to an envelope detector 56 which utilizes known techniques to calculate the square root of the sum of $I^2+Q^2$ and generate an envelope signal on line 58 representative thereof.

The I channel signal on line 54(I) and the Q channel signal on line 54(Q) are also coupled to a first data recovery circuit 60, typically including an equalizer and a slicer, for recovering QAM modulated data while the envelope signal on line 58 is coupled to a second data recovery circuit 62 for recovering PPM modulated data. Both he first data recovery circuit 60 and the second data recovery circuit 62 are coupled to a media access controller 64 (MAC) for further processing of the data and determination of whether the received frame is PPM, QAM, or compatibility mode. The MAC 64 outputs the frame type on line 65.

It should be appreciated that the first data recovery circuit 60 may be configured for a 32 Mhz sampling frequency while the second data recovery circuit 62 may be configured for a 30 Mhz sampling frequency because the sampling frequency, as set on clock input line 46, will be adjusted to either 30 Mhz, or 32 Mhz in response to detecting the frame type.

The envelope signal on line 58 is also input to a low pass filter 66 generating a filtered envelope signal on line 68. The filtered envelope signal is coupled to a clock select circuit 70 which generates the clock select signal on line 50 in accordance with detection of a PPM frame, QAM frame, and compatibility mode frame.

Figure 4:
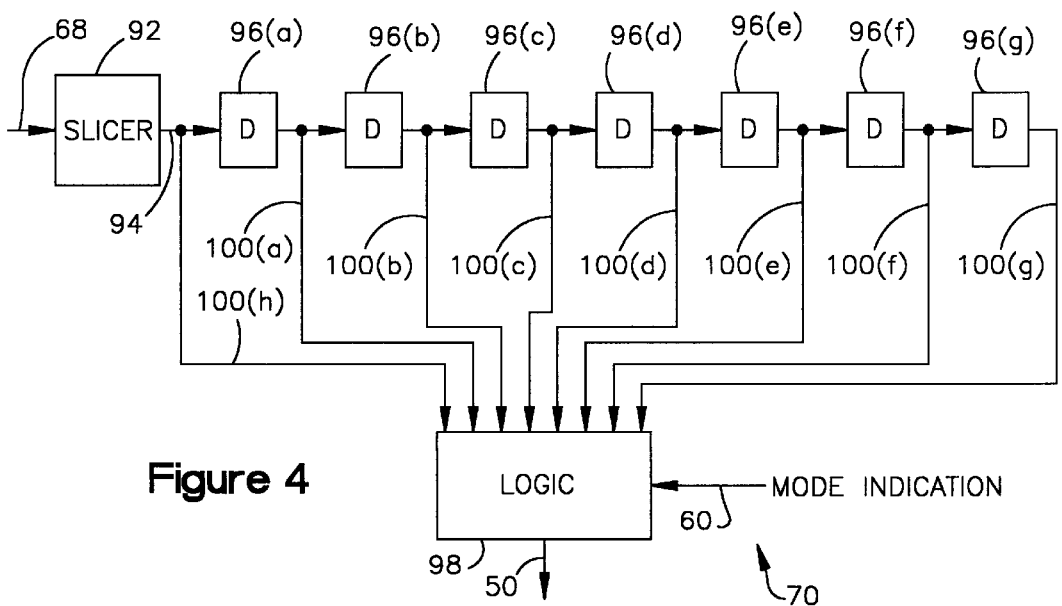
FIG. 4 is a block diagram of a clock select circuit in accordance with one embodiment of this invention.

Referring to FIG. 4, the gain select circuit 70 will typically include a slicer 92 or other threshold detector for receiving the filtered envelope signal on line 68. The slicer 92 compares the filtered envelope signal to a threshold value and generates a slicer output signal on line 94 which is logic high when the filtered envelope signal is greater than or equal to the threshold value and is logic low when the filtered envelope signal is less than the threshold value.

The slicer output signal is sequentially input to a series of delay elements 96(a)–96(g). Each delay element 96(a)–96(g) functions to delay the slicer output signal by 0.5 usec. The slicer output signal from the slicer 92 and from each of the delay elements 96(a)–96(g) is input to a logic circuit 98 through tap lines 100(a)–100(h).

It should be appreciated that because each delay element 96(a)–96(g) represents a 0.5 usec delay in the slicer output signal, in the event that the slicer output signal remains logic high for a duration of 3 usec, the output of six sequential delay elements, as input to logic circuit by tap lines 100(a)–100(h) will be logic high.

Figure 5:
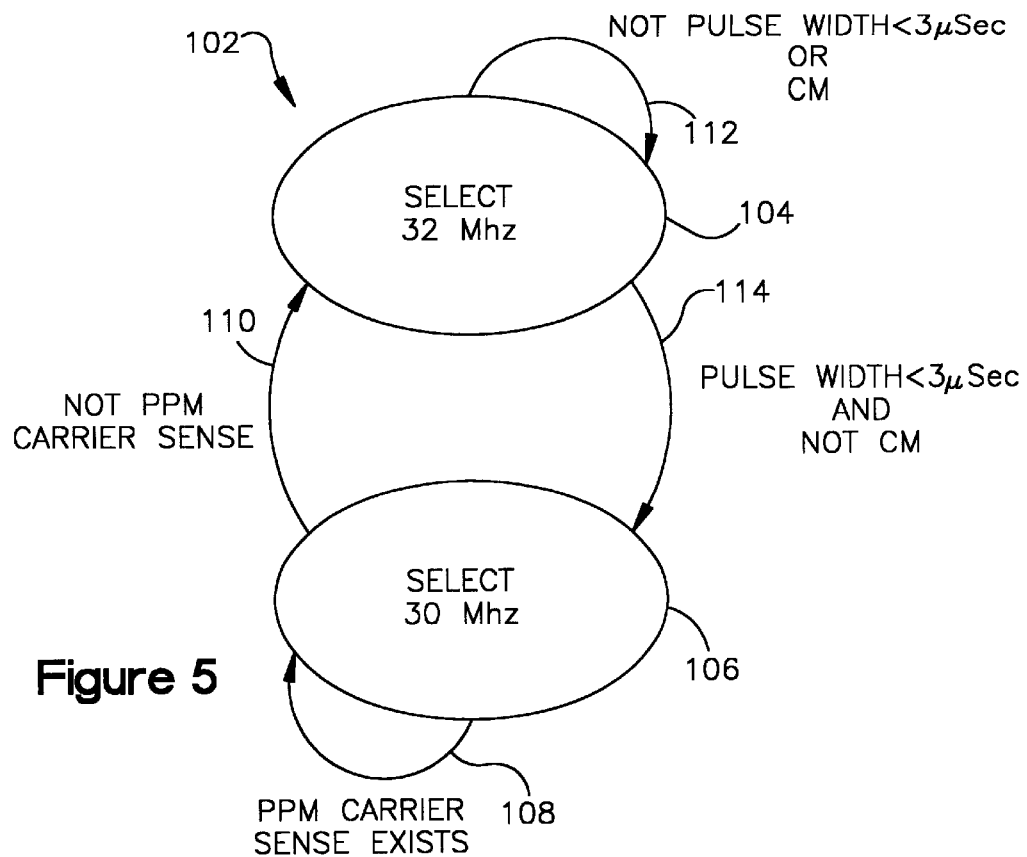
FIG. 5 is a state machine diagram showing operation of the clock select circuit of FIG. 4.

The logic circuit 98 operates to generate the clock select signal on line 50 which represents 30 MHz and 32 Mhz in accordance with clock select state machine 102 as shown in FIG. 5.

Referring to the state machine diagram of FIG. 5, 104 represents the state wherein the clock select signal represents 32 Mhz and state 106 represents the state wherein and clock select signal represents 30 Mhz.

When the logic circuit 98 is in state 104, it will remain in state 104 via loop 112 so long as the detected pulse width is not less than 3 usec. (e.g. either no pulse detected for the 3 usec or a continuous pulse detected on the tap lines 100(a)–100(h)) or compatibility mode is indicated by the MAC on line 65. Correspondingly, a detected pulse width less than 3 usec and the lack of compatibility mode indicated on line 65 will transition the state machine 103 to state 106 via transition 114.

The state machine 102 will remain in state 106 via loop 108 so long as PPM mode is indicated on line 65 from the MAC. Correspondingly, if PPM mode is not indicated on line 65 from the MAC, the state machine 102 will transition back to state 104 via transition 110.

Figure 6:
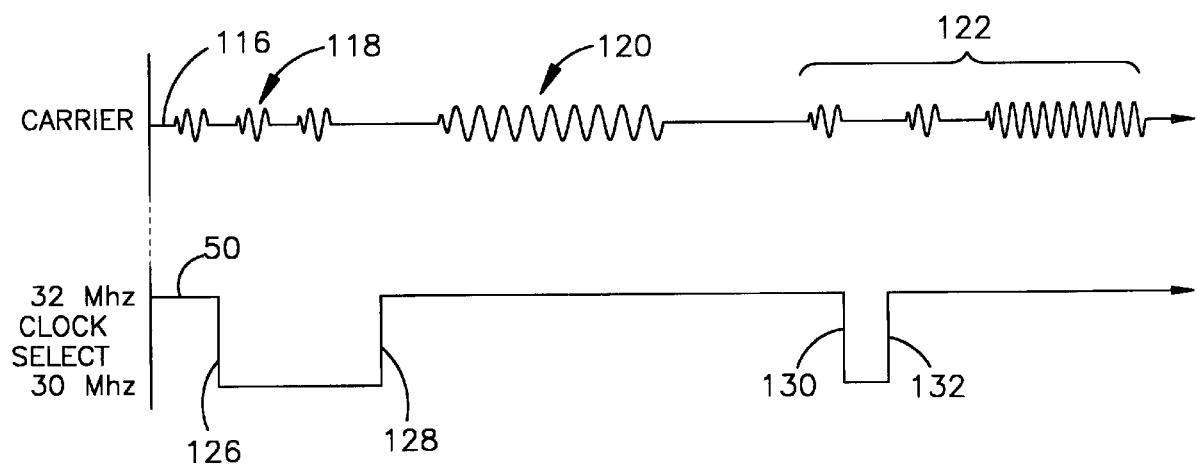
FIG. 6 is a diagram showing exemplary operation of the state machine of FIG. 5.

Referring to FIG. 6, a timing diagram showing exemplary operation of the clock select state machine is shown. Carrier signal 116 comprises a PPM frame 118, a QAM frame 120, and a compatibility mode frame 122 which consists of a PPM header followed by QAM data. As discussed with reference to FIG. 5, the clock select signal 50 will remain in the 32 Mhz state so long as pulses of less than 3 usec are not detected and compatibility mode is not indicated. Transition 126 near the beginning of PPM frame 118 indicates a transition to 30 Mhz upon the detection of pulses of less than 3 usec duration. Similarly, transition 130, near the beginning of the compatibility mode frame 122, represents a transition to 30 Mhz upon the detection of pulses less than 3 usec in duration. However, transition 132 represents the immediate transition back to 32 Mhz upon compatibility mode being indicated by the MAC. It should be appreciated that in the event that the receiver can detect and indicate compatibility mode before transition 130, transition 130 will not occur. Upon completion of PPM frame 118, transition 128 to 32 Mhz occurs simultaneously with transition 110 (FIG. 5).

It should be appreciated that the above described device and methods provide for a simplified receiver system by selecting between multiple sampling clock frequencies, each selected to optimize receiver circuitry for a particular modulation specification.

Although the invention has been shown and described with respect to certain preferred embodiments, it is obvious that equivalents and modifications will occur to others skilled in the art upon the reading and understanding of the specification. For example, while the exemplary embodiment is directed towards PPM and QAM modulation, frequency modulation, phase shift keying, and other modulation techniques are readily substituted. Further, while the exemplary embodiment utilizes an envelope detector for distinguishing between the modulation techniques, other distinguishing techniques are readily used based on the distinguishing characteristics of a carrier signal modulated utilizing selected modulation techniques. The present invention includes all such equivalents and modifications, and is limited only by the scope of the following claims.

What is claimed is:

1. A network receiver configured for receiving a modulated carrier signal representing a frame of data from another network transmitter via a network medium, the network receiver comprising:

a) an analog to digital converter generating a sequence of digital samples representing the modulated carrier signal, the sequence of digital samples occurring at an A/D clock frequency;

b) a frame detection circuit setting the A/D clock frequency to a first sampling frequency when a first modulation specification is detected and setting the sampling clock frequency to a second sampling frequency when the first modulation specification is not detected; and c) a receiver circuit recovering data from the digital samples and generating a frame type signal indicating the modulation specification, wherein the first modulation specification utilizes pulse position modulation of the carrier signal, a second modulation specification utilizes quadrature amplitude modulation of the carrier signal, and a third modulation specification utilizes a combination of pulse position modulation of the carrier signal and quadrature amplitude modulation of the carrier signal, the frame detection circuit includes a carrier sense circuit for detecting the duration of a power pulse in an envelope signal, and the frame detection circuit sets the A/D clock frequency to the first sampling frequency when the duration of a power pulse is less than a duration of a pulse position modulation power pulse and the frame type signal does not indicate the third frame type.

2. The network receiver of claim 1, wherein the envelope signal represents the square root of the sum of the square of the I channel carrier signal and the square of the Q channel carrier signal.

3. The network receiver of claim 1, wherein the frame detection circuit sets the A/D clock frequency to the second sampling frequency when power pulses of a duration on the order of a pulse position modulation power pulse are not detected.

4. The network receiver of claim 3, wherein the frame detection circuit sets the A/D clock frequency to the second sampling frequency when the frame type signal indicates one of the second and third frame type.

5. A method of determining an A/D clock setting for sampling a modulated carrier signal representing a data frame in a receiver configured for receiving a modulated carrier signal from a network medium, the method comprising:

a) detecting whether the frame corresponds to a first modulation specification;

b) selecting a first A/D clock setting in response to detecting a frame corresponding to the first modulation specification;

c) selecting a second A/D clock setting in response to not detecting a frame corresponding to the first modulation specification;

d) detecting whether the frame corresponds to a second modulation specification and whether the frame corresponds to a third modulation specification, wherein the first frame specification utilizes pulse position modulation of the carrier signal, a second frame specification utilizes quadrature amplitude modulation of the carrier signal, and a third frame specification utilizes a combination of pulse position modulation of the carrier signal and quadrature amplitude modulation of the carrier signal; and e) detecting the duration of a power pulse in the carrier signal, wherein the A/D clock frequency is set to the first sampling frequency when the duration of a power pulse is less than a duration on the order of a duration of a pulse position modulation power pulse and third frame type is not detected.

6. The method of claim 5, wherein the A/D clock frequency is set to the second sampling frequency when power pulses are of a duration on the order of a pulse position modulation power pulse and the third frame type is not detected.

7. The method of claim 6, wherein the A/D clock frequency is set to the second sampling frequency when one of the second frame type and the third frame type are detected.

* * * * *